(No Model.)

P. SCHARF.
ELECTRIC INCANDESCENT LAMP.

No. 502,322. Patented Aug. 1, 1893.

Witnesses:
H. G. Dieterich
M. J. L. Higgins

Inventor:
Paul Scharf
By _____ Atty.

UNITED STATES PATENT OFFICE.

PAUL SCHARF, OF VIENNA, AUSTRIA-HUNGARY.

ELECTRIC INCANDESCENT LAMP.

SPECIFICATION forming part of Letters Patent No. 502,322, dated August 1, 1893.

Application filed April 17, 1893. Serial No. 470,701. (No model.)

*To all whom it may concern:*

Be it known that I, PAUL SCHARF, a subject of the Emperor of Austria-Hungary, residing at Vienna, in the Province of Lower Austria, in the Empire of Austria-Hungary, have invented certain new and useful Improvements in Electric Incandescent Lamps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to incandescent lamps, and particularly to the connections between the leading in wires for the carbon filament and the glass bulb, and the connections between said leading in wires and the contact wires. Generally speaking, the leading in wires of incandescent lamps have heretofore been made of platinum, on the ground that no other metal or alloy possesses the same qualities as platinum, to wit: a co-efficient of expansion similar or nearly similar to that of glass, non-oxidizable, and capable of resisting the temperature required to seal said wires into the neck of the lamp. These properties or qualities are requisite to the obtaining of a permanently air tight joint between said leading in wires and their glass bearings. The attempts heretofore made to use base metal leading in wires have given more or less unsatisfactory results, and my invention has for its object the provision of simple means whereby such base metal leading in wires may be advantageously employed. I would have it understood, however, that my invention may also be applied with advantage to the usual platinum leading in wires. But that my invention may be fully understood, I will describe the same in detail, reference being had to the accompanying drawings, in which—

Figure 1:
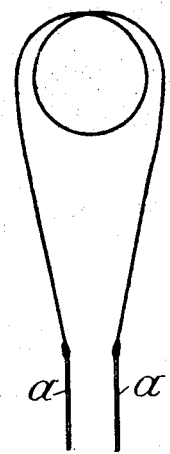
Figure 2:
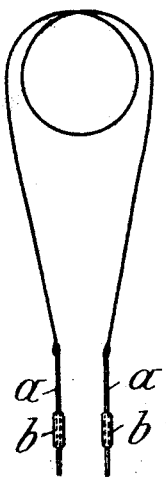
Figure 3:
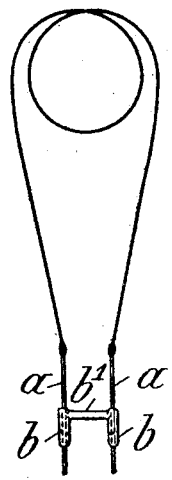
Figure 4:
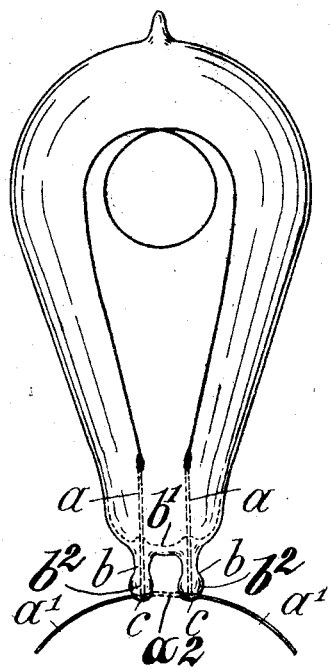
Figure 5:
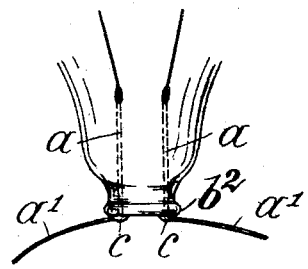

Figures 1, 2 and 3, illustrate by elevations the mode of connecting the leading in wires with the carbon filaments, and Figs. 4 and 5 illustrate by like views the mode of connecting the leading in wires with the neck of the lamp bulb and with the contact wires.

In carrying out my invention the leading in wire $a$, after embedding or sealing the same into the glass neck of the lamp bulb are preferably broken or cut off flush with the outer face of their bearings, the exposed surface of the wires being then covered or coated with a precious metal, as gold, reduced to a thick paste by pulverizing and mixing with a thick oil, as thick turpentine, soft rosin, Canada or copaiva balsam, the coating after becoming dry being burned in by exposure to the flame of a Bunsen burner, for instance. This coating of precious metal may then be covered over with a soft solder as tin solder, and the pole or contact wires, $a'$ such as thin copper wires are next connected with the soft solder and precious metal coating in any desired manner. This connection may be greatly facilitated by laying or stretching a copper wire of sufficient length across the metallized exposed faces of the leading in wires and then covering the parts in contact with a soft solder, as shown at $c$, Figs. 4 and 5, the portion of the copper contact wire $a^2$ between the two leading in wires $a$ shown in dotted lines in Fig. 4 being then cut out. In this manner a permanently air tight joint between the leading in wires and their bearings is obtained. If desired the base metal leading in wires may be sealed to the glass bulb in the same manner as is customary with platinum wires, namely by forming thereon a glass bearing $b$, Figs. 1 and 2, and in this case I preferably connect the two bearings $b$ by means of crosspiece or bridge, $b'$, of the same material, as shown in Fig. 3, whereby the subsequent operation is facilitated. These bearings, $b$ are preferably made long enough so that when embedded in the neck of the bulb they will project therefrom and can then be enlarged or reinforced by addition of glass, as shown at $b^2$ Fig. 4, and if desired the bridge or crosspiece $b'$ may also be melted into the neck of the bulb, as shown in dotted lines in the latter figure. On the other hand, the bearings may be embedded in the neck of the bulb by compressing, *i. e.*, flattening the neck onto the bearings and then reinforcing the lower end of said neck by addition of glass or by forming the reinforcing bead $b^2$ on the neck beforehand, so as to obtain a more extended surface for the coating of precious metal and for the soft solder c, as shown in Fig. 5, the contact wires a' being connected with the leading in wires a, as above described.

Having thus described my invention, what I claim as new therein, and desire to secure by Letters Patent, is—

1. The mode of connecting the leading in wires of incandescent lamps with the lamp bulb and the contact wires, which consists in embedding said leading in wires in the neck of the bulb, cutting the wires flush with the outer face of their bearings, covering the exposed wire surface with a precious metal and connecting the contact wire with the precious metal by soldering, for the purpose set forth.

2. The mode of connecting the leading in wires of incandescent lamps with the lamp bulb and with the contact wires, which consists in forming glass bearings on the leading in wires, embedding said bearings in the neck of the lamp so as to project therefrom, reinforcing said bearings by addition of glass, cutting the leading in wires flush with the lower face of their bearings, covering the exposed wire surface with a precious metal, and soldering the contact wires to the precious metal by means of soft solder, for the purposes set forth.

3. The mode of connecting the leading in wires of incandescent lamps with the lamp bulb and with the contact wires, which consists in embedding the leading in wires in the neck of the bulb, cutting said wires flush with the outer face of said neck, covering the exposed wire surfaces with a precious metal, laying a contact wire across the precious metal coverings, soldering said contact wire thereto by means of soft solder and cutting out that portion of the contact wire between the points of connection with the precious metal, for the purposes set forth.

In testimony whereof I affix my signature in presence of two witnesses.

PAUL SCHARF.

Witnesses:
H. BELMONT,
A. SCHTENING.